United States Patent Office 3,463,439
Patented Aug. 26, 1969

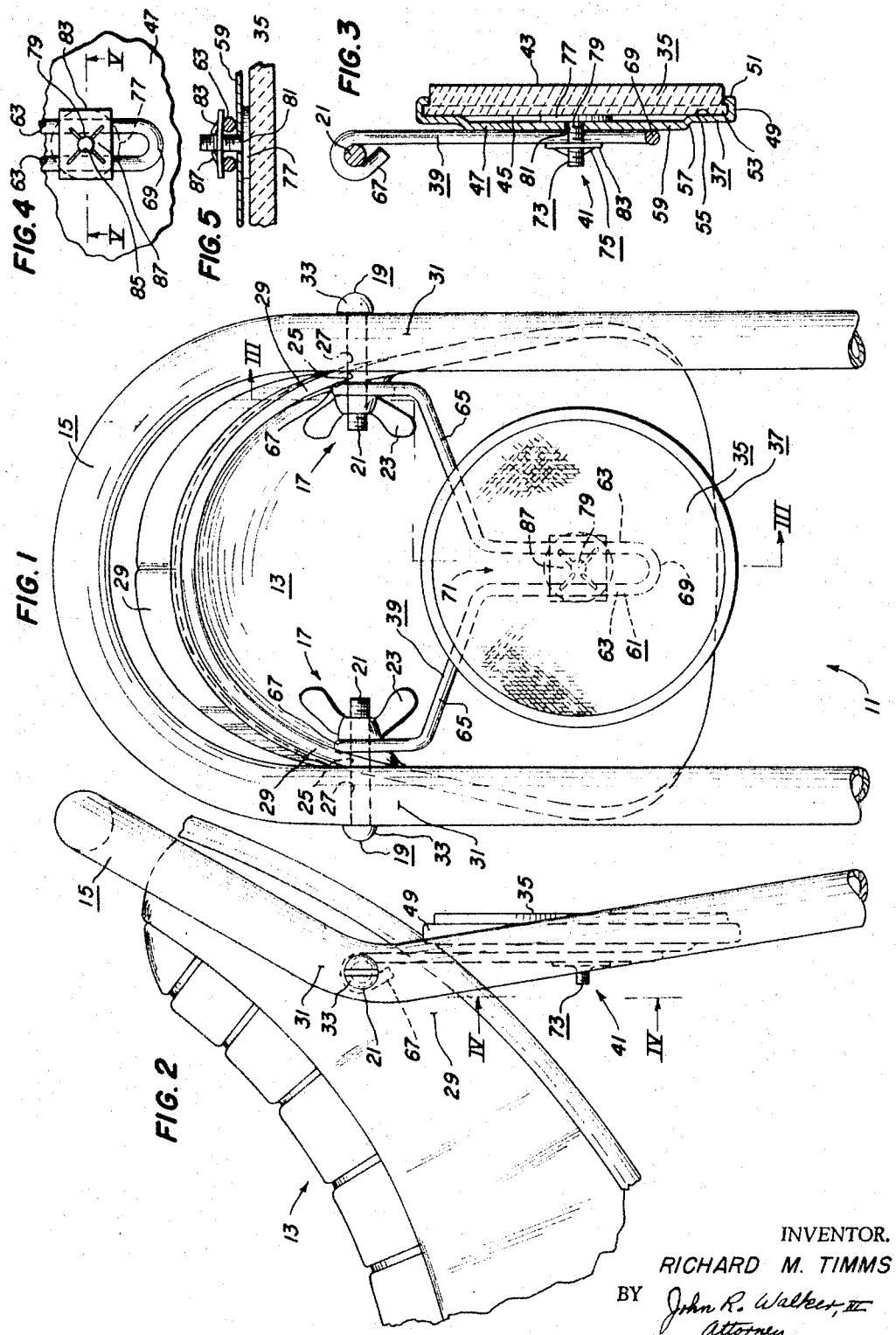

3,463,439
SAFETY REFLECTOR MEANS FOR BIKE SEAT STRUCTURE
Richard M. Timms, Memphis, Tenn., assignor to Troxel Manufacturing Company, Moscow, Tenn.
Filed Oct. 20, 1967, Ser. No. 676,745
Int. Cl. A47g 1/24; G02b 5/08
U.S. Cl. 248—480
4 Claims

ABSTRACT OF THE DISCLOSURE

Rear reflector means especially adapted for use on a bicycle having an elongated bicycle saddle or seat and an inverted U-shaped brace rod supporting the rear of the seat. The invention includes rear reflector means including bracket means adapted for securement underneath the bicycle seat and between the downwardly projecting leg portions of the U-shaped brace. The reflector lens being adapted to be pivotally adjustable about a horizontal axis and also adapted to be translationally vertically adjustable.

BACKGROUND OF THE INVENTION

Field of the invention

The present invention relates to reflector means generally and particularly to support means for adjustably supporting a safety reflector.

Description of the prior art

Previously, the rear reflector means on a bicycle having an elongated bicycle seat was supported from the downwardly extending brace rods which supported the rear of the seat. The type of elongated bicycle seat referred to herein is well known and is that type which the assignee of the present invention and others presently manufacture, and which assignee refers to its seat by the trademark "Banana Seat." The typical manner of supporting a rear reflector lens was by way of a yoke member fixed on and horizontally spanning the leg portions of the elongated seat brace rods. Such reflector support means presented problems: The youngster or bike rider often desired to raise or lower the back of the banana seat by changing the effective length of the seat brace rods. He also may desire to change the fore and aft inclination of the seat. When such an adjustment is made, the setting of the reflector is changed and it is usually not set correctly for properly reflecting the light from a following vehicle.

In prior art bike seat-reflector combinations it was difficult or impossible to set the reflector properly. Also, in some instances the yoke mounted reflector was arranged some distance below the bicycle seat and this detracted from the appearance of the seat structure. In addition, prior reflector supporting means were not adaptable for various designs of elongated bicycle seats in which the depending rearward skirts were of different lengths.

SUMMARY OF THE INVENTION

The present invention provides safety reflector means for a bicycle which includes means for pivotally adjusting the reflector lens about a horizontal axis and also includes means for translationally vertically adjusting the reflector lens. The pivotal adjustment of the reflector provides a ready way for correctly angling the reflector, as for example, after the seat has been adjusted and the fore and aft inclination of the seat has been changed. The vertical tranlational adjustment of the reflector provides a ready way for adjusting the reflector to properly fit closely subjacently in the channel-shaped underside of the bicycle seat; the vertical adjustment of the reflector contributes to proper seat structure design and to a neat appearing seat structure.

BRIEF DESCRIPTION OF THE DRAWING

FIG. 1 is a rear elevational view of the safety reflector means of the present invention illustrated in conjunction with an elongated bicycle seat structure of the type heretofore mentioned (pertinent parts only of the seat structure being shown).

FIG. 2 is a side elevational view taken as from the left of FIG. 1.

FIG. 3 is a vertical sectional view of the reflector means taken as on the line III—III of FIG. 1.

FIG. 4 is a view of the rear central portion of the reflector structure taken as on the line IV—IV of FIG. 2.

FIG. 5 is a horizontal plane sectional view taken as on the line V—V of FIG. 4.

DESCRIPTION OF THE PREFERRED EMBODIMENT

In the drawings, the safety reflector means of the invention is indicated by numeral 11 and is illustrated in conjunction with an elongated seat 13, a U-shaped brace rod 15, and seat-brace rod connecting means 17, 17. Seat-brace rod connecting means 17, 17 comprise screw fasteners 19, 19 including respectively bolts 21, 21 and wingnuts 23, 23. Bolts 21, 21 extend respectively through apertures 25, 25 and 27, 27 formed respectively in seat body portions 29, 29 and brace rod portions 31, 31. Screw fasteners 19, 19 are convergingly arranged and respectively with head portions 33, 33 engaging respectively rod portions 31, 31 of brace rod 15.

Safety reflector means 11, which constitutes the inventive structure, primarily includes a reflector lens 35, a frame 37, a bracket 39 and attachment means 41 adjustably securing frame 37 and bracket 39.

Lens 35 is preferably circular and formed of plastic or glass material in the well known manner and includes an obverse surface 43 and a reverse surface 46. Frame 37 is generally disc-shaped and includes a circular body portion 47 and a circumferentially extending flange portion 49. The rim portion of frame flange 49 is turned inwardly and defines an internal circumferential flange 51. Internal flange 51 is formed around and securely engages external flange portion 53 of lens 35. The engagement of flanges 51, 53 respectively of frame 37 and lens 35 secures the parts together with reverse surface 45 of lens 35 parallel engaging annular interior surface 55 of the frame.

Frame 37 includes an annular offset portion 57 arranged concentrically within annular surface 55 and defines a central portion 59.

Bracket 39 is preferably formed from a single piece of round-sectioned wire and includes a medial portion 61 including a parallel pair of rod portions 63, 63 and a pair of wing portions 65, 65. Included in wing portions 65, 65 and arranged respectively at the opposite end portions of bracket 39 are a pair of eye portions 67, 67. The eye portions are arranged parallel and in coaxial alignment, and are spaced at a distance corresponding with the distance between seat body portions 29, 29. Bracket 39 is adapted for securement to the rearward underportion of elongated seat 13. Bolts 21, 21 respectively of screw fasteners 19, 19 extend through eye portions 67, 67. Bracket 39 is adapted to be arranged in a generally vertical disposition with wingnuts 23, 23 turnably engaging eye portions 67, 67. Parallel rod portions 63, 63 in conjunction with center arcuate portion 69 define a vertical slot opening 71.

Attachment means 41 preferably includes bolt means 73 and nut means 75. Bolt means 73 is fixedly secured on reflector frame 37 and includes a generally flat base portion 77 and stud portion 79. Bolt means 73 is secured on reflector frame 37 with stud portion 79 projecting through aperture 81 and with base portion 77 fixedly secured between frame central portion 59 and reflector reverse surface 45. Nut means 75 preferably is in the form of the well known speed nut, indicated 83, and includes a generally flat slightly arced body having a central aperture 85. Speed nut 83 typically includes a plurality of circumferentially arranged spur portions 87 defining substantially aperture 85. Frame 37 is adjustably secured on bracket 39 with stud portion 79 projecting through slot opening 71; nut 83 threadedly engages stud portion 77 and simultaneously engages parallel rod portions 63, 63 of bracket medial portion 61.

A desired translational vertical adjustment of safety reflector means 11 may be had by vertically adjustably manipulating lens 35 relative to bracket 39: By selectively loosening and tightening nut 83 and adjustably positioning stud portion 79 in slot opening 71 a desired vertical adjustment of safety reflector lens 35 may be obtained. By vertically adjusting lens 35 relative to bicycle seat 13, the lens may be subjacently positioned closely adjacent to the underside of the seat and provide a neat appearing seat structure. By selectively loosening and tightening threaded fasteners 19, 19 reflector lens 35 may be correctly angled or positoned; by pivotally manipulating reflector lens 35 a desired horizontal setting of the reflector may be obtained and an optimum setting for reflecting lights from vehicle approaching from the rear of the bicycle.

Now while I have shown and described an exemplary embodiment of the present invention, it will be understood that various modifications may be made therein which are within the scope of the invention.

I claim:

1. The combination with a bicycle including seat structure including a bicycle seat and an inverted U-shaped brace supporting the rear of the seat and with the seat-brace connecting means including a pair of screw fasteners including coaxially arranged left and right screw fasteners each extending horizontally and secured respectively in apertures in left and right portions of said seat and said U-shaped brace, safety reflector means adapted for securement on said seat structure for warning drivers of vehicles approaching the rear of the bicycle comprising a frame means and a lense having properties of reflection mounted on said frame means, a bracket including a pair of eye portions arranged coaxially in horizontally spaced apart configuration, said bracket including a vertically extending parallel pair of closely spaced rod portions defining a vertically extending horizontally open slot opening, and attachment means adjustably fixedly attaching said frame means and said bracket including a stud portion extending through said slot opening and nut means engaging said stud portion.

2. The safety reflector means of claim 1 wherein said attachment means includes means adjustably fixedly attaching said frame means and said bracket including a single stud portion fixed on and extending perpendicularly laterally from said frame means and on the opposite side of said frame means from said reflector means, and wherein said nut means includes a speed nut, said reflector lens being secured on said bracket with said stud extending through said bracket parallel rod portion and with said speed nut engaging said rod portion and clampingly securing said frame means and said bracket.

3. The safety reflector means of claim 2 wherein said stud portion is threaded and said speed nut is threadedly engaged on said stud portion.

4. Safety reflector means adapted for securement on a bicycle seat of the type having a brace supporting the rear of said seat with the seat-brace connecting means including a pair of screw fasteners including coaxially arranged left and right screw fasteners each extending horizontally and secured respectively in apertures in left and right portions of said seat and said seat-brace, said safety reflector means comprising a circular lens having front and back side surfaces, a circular disc-like frame secured around the periphery of said lens and solidly spanning said back side surface of said lens, a bracket formed a single piece of round-sectioned wire formed to include a parallel pair of rod portions arranged medially of the length of said wire, an eye portion formed on each end of said length of wire and with the eye portions being spaced apart and arranged coaxially and defining left and right eye portions, and attachment means adjustably fixedly attaching said frame means and said bracket; said safety reflector means being adapted for securement on said seat structure with said pair of screw fasteners extending respectively through said eye portions of said bracket for warning drivers of vehicles approaching the rear of the bicycle.

References Cited

"American Bicyclist & Motorcyclist," August 1964, p. 8.

"American Bicyclist & Motorcyclist," October 1965, p. 11.

"American Bicyclist & Motorcyclist," January 1967, p. 44.

ROY D. FRAZIER, Primary Examiner

FRANK DOMOTOR, Assistant Examiner

U.S. Cl. X.R.
350—307